United States Patent Office 3,041,248
Patented June 26, 1962

3,041,248
CONTROL OF BACTERIOPHAGE
Robert E. Hargrove, Alexandria, Va., assignor to the United States of America as represented by the Secretary of Agriculture
No Drawing. Filed June 1, 1960, Ser. No. 33,351
10 Claims. (Cl. 195—48)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application bearing Serial No. 815,237, filed May 22, 1959, and now abandoned.

This invention relates to the control of bacteriophage in milk starters. More particularly, this invention relates to prevention and elimination of bacteriophage in bacterial cultures used in the manufacture of cheese and other milk products.

For many years bacteriophage, hereinafter referred to as phage, which is active against lactic acid bacteria has been a serious threat to the manufacture of all types of cheese, cultured milks, and related products. In the sequence of mother starter to bulk starter to vat, the development of a vigorous, abundant growth of the desired bacteria in the starters is of utmost importance. Many surveys have shown that phage is one of the primary causes of bacterial starter failure in the industry. Inhibition and actual destruction of the bacteria occur before sufficient acid can be developed in a particular product, and the result has been innumerable failures and serious economic loss in the manufacture of these products.

Cheese factories and dairy plants are known to be widely infected with phage and the operations within a plant are conducive for its dissemination. Phage contamination of lactic starters is difficult to prevent in the factory even when the utmost care is taken to prevent contamination from the air and equipment. The use of aseptic techniques in culture handling is almost impossible if not impractical. The conventional methods for freeing a mixed lactic culture of phage are laborious and time consuming. Even with the best techniques, one is apt to lose some of the bacterial strains in a mixed starter, and the recombination of the strains in the same proportions is impossible. Currently available selective media designed to suppress the activity of phage, have the disadvantage that they also inhibit the growth of many strains of lactic acid bacteria.

The medium of choice for culturing and maintaining the activity of lactic acid bacteria is milk. The general practice is to add the inoculum to either fresh skim milk or reconstituted skim milk (10% solids), although whole milk is equally acceptable for the purposes of this invention.

In a typical manufacturing process, the mother starters are usually transferred daily in sterile skim milk. The mother starters generally are composed of several strains of one or more lactic acid (Streptococcus) species and often contain Leuconostoc species which have been included because they contribute desirable characteristics, especially as regards to flavor, to the manufactured product. This starter, after 16 to 18 hours at 72° F. is used to inoculate a larger volume of milk, the bulk starter. The bulk starter is usually prepared by steaming fresh or reconstituted skim milk at 100° C. for 60 to 90 minutes. The steamed milk is cooled, inoculated with the mother starter, and after 16 to 18 hours' incubation at 72° F., is used in the actual manufacture of a particular cultured milk product. The exact volumes of the starters, number of starters, etc., may vary with procedures preferred by the operator, the size of the milk vats, and the product being manufactured.

An object of this invention is to provide a means of freeing contaminated milk starters of phage without suppressing the growth of, or altering the ratio of, the lactic acid bacteria or the Leuconostoc strains that may be contained in a given starter. A further object of this invention is to provide a means of maintaining phage-free stock cultures (mother starters) and bulk starters by preventing phage multiplication even when subjected to accidental contamination. Other objects and fuller understanding of the invention may be had by referring to the following description and claims.

The objects of this invention have been achieved by a pre-inoculation treatment of starter milks comprising mixing phosphate salts therewith and heating the resulting mixture under particular conditions.

According to the present invention a milk medium for culturing lactic acid bacteria is prepared by a process which involves forming a mixture having a pH of about from 6.3 to 6.9 and containing milk, which may be whole milk, skim milk, or reconstituted skim milk, and about from 1 to 3%, based on the weight of the milk, of phosphates selected from the group consisting of sodium phosphates, potassium phosphates, ammonium phosphates, mixtures thereof, and a mixture of each of said sodium, potassium, or ammonium phosphates, with sodium pyrophosphate or potassium pyrophosphate, heating the milk containing the phosphates at a temperature of about from 80 to 100° C., for at least about 15 minutes, preferably for about from 15 to 30 minutes to produce a milk medium resistant to the growth of, and free from, bacteriophage, and then cooling the thus-produced milk medium to a temperature suitable for inoculation with lactic acid bacteria, preferably below about 90° F. Thereafter, lactic acid bacteria can be cultured in said bacteriophage-growth resistant and bacteriophage-free milk medium.

The term "phosphates," for example, sodium phosphates, is used in describing the salts mixed with the milk because, as is well known in the art, the designated range of pH can only be obtained by an equilibrum mixture of acidic and basic phosphates, such as primary sodium phosphate, $NaH_2PO_4$, and secondary sodium phosphate, $Na_2HPO_4$. Equilibrum mixtures in this range of pH can be prepared also from other starting materials, such as by combining proper ratios of tri-sodium phosphate, $Na_3PO_4$, and phosphoric acid, $H_3PO_4$, or by adding sodium hydroxide to phosphoric acid or to primary sodium phosphate.

As used herein, the sodium, potassium, and ammonium phosphates refer to the "orthophosphates" unless otherwise specified, e.g., pyrophosphates. The orthophosphates were employed solely in Examples 1–6 and the pyrophosphates were employed, in Example 7, in combination with the orthophosphates.

This invention applies equally well to milk that has been sterilized for mother starters or milk that has been steamed for bulk starters. In each instance the mixing of the phosphate salts with the milk and the heating of the milk in the presence of these salts is necessary for maximum control of the development of phage. The salts are not mixed with the milk prior to autoclaving (usually a temperature of about 120° C.) because an undesirable precipitation occurs. As mother starters are maintained in sterile milk, sterile phosphate salts must be mixed aseptically with sterilized (autoclaved) milk, the phosphated milk heated to about from 80 to 100° C. for at least about 15 minutes, and then cooled and inoculated aseptically in a conventional manner. The customary steaming of milk for bulk starters, that is, at temperatures of about from 80 to 100° C. for about one hour, does not cause precipitation when phosphate salts are present. Hence, in this instance, a solution of phosphate salts is mixed with the milk prior to or during the steaming operation and the subsequent steaming supplies the necessary heat treatment required to condition the milk medium.

This invention provides a method for freeing either single or mixed bacterial cultures of homologous phage regardless of the degree of phage contamination. It permits the normal growth of lactic strains in a milk medium and causes no inhibition or change in culture activity. Another desirable feature of this invention is the effective manner in which lactic phage may be eliminated from a lactic culture that contains desirable Leuconostoc strains. Although lactic phage is not a problem in regards to growing Leuconostoc species, the effect of changing the medium upon growth of Leuconostoc is a factor to be considered in the utility of the present invention. The phosphate salts do not inhibit Leuconostoc strains nor alter their ratio to lactic acid bacteria in a mixture. In addition to maintaining phage-free mother cultures, this invention, when applied to intermediate or bulk starters, prevents the injurious effects of phage while the lactic acid bacteria are propagating in this medium. By the use of this invention the same strains of bacteria may be kept in continuous transfer, thus helping to standardize the quality of the product of a particular process.

An essential feature of the present invention is that milk (with or without removal of butterfat) be used as the basic bacteriological medium. Although cow's milk predominates in the world-wide manufacture of cheese and related milk products, the milk of the sheep, goat, buffalo and camel is also used for these purposes and the invention is considered to apply thereto.

Sodium and potassium phosphates and mixtures of the two were equally effective in controlling phage in lactic cultures under optimum conditions. Ammonium phosphate was also found to be effective in controlling phage in the designated range of pH. When potassium or sodium pyrophosphate is employed it is utilized together with the sodium, potassium, or ammonium phosphates.

The phosphate salts are conveniently mixed with the milk as a concentrated solution. The important factors to consider are the pH provided by the phosphates in solution, and the level of phosphate, namely, about from 1 to 3%, based on the weight of the milk, to be mixed with the milk. The desired pH may be obtained by various methods, for example, by combining calculated amounts of primary and secondary phosphates, or starting with a solution of a primary phosphate, by adding a concentrated solution of the respective hydroxide, thus providing the proper ratio of primary and secondary salts. A level of concentration exceeding about 3% of the phosphates seriously retards the activity of the lactic acid bacteria in the culture.

The following examples illustrate the basis for establishing conditions of pH and level of mixing of phosphate salts.

EXAMPLE 1

A volume of skim milk was divided into six equal parts. A sodium phosphate salt solution of pH 6.6 was added to five portions of the milk to provide salt levels of 1, 1½, 2, and 3% by weight of the milk, respectively, in these portions. The sixth portion received no salt and served as a control. The six media were heated to 100° C. for 15 minutes, apportioned into test tubes, and cooled to room temperature. Four different strains of lactic acid bacteria, *Streptococcus cremories* C–13, *S. cremoris* H–1, *S. cremoris* ML–1, and *S. lactis* C–3, were added in constant amounts of inocula to control tubes containing no added phage and to tubes at each salt level containing phage known to attack each respective strain of lactic acid bacteria. The phages, containing a minimum of $1 \times 10^8$ particles per ml., were serially diluted and 0.1 ml. added to each tube. Referring to Table 1, adding 0.1 ml. undiluted phage culture to 10 ml. milk is indicated as a $10^2$ dilution. Adding 0.1 ml. of the first dilution to 10 ml. of milk is indicated as $10^3$ dilution, etc.

In addition to the four strains described above, eight additional strains, namely *S cremoris* H–2, H–3, H–4, H–5, Z–8, HP, R–1, and KH, were similarly tested and gave similar results.

Eleven of the 12 different phage types were inhibited and controlled by the 2% level of phosphate while the action of some phage types may even be controlled with 1.5 and even 1% phosphate. The data shows that one phase, ML–1, requires as much as 3% phosphate to inhibit phage proliferation in the presence of a large phage inoculum.

Twelve single lactic strains, including *S. lactis* and *S. cremoris* types, four commercial mixed starters, and twelve different Leuconoctoc strains were not inhibited when cultured in 2% phosphate-treated milk. Repeated transfers in the milk over a month's period caused no loss in activity. In some instances cultures stored in the phosphate-containing milks retained greater viability than controls.

Table 1
EFFECT OF CONCENTRATION OF SODIUM PHOSPHATES AT pH 6.6 ON PHAGE ACTIVITY

| Percent phosphates added to milk | Lactic culture | Lactic growth (phage dilution) | | | | | | Lactic control |
|---|---|---|---|---|---|---|---|---|
| | | $10^2$ | $10^3$ | $10^4$ | $10^5$ | $10^6$ | $10^7$ | |
| 0   | C-3  | − | − | − | − | − | − | + |
| 1.0 | C-3  | − | + | + | + | + | + | ++ |
| 1.5 | C-3  | − | + | + | + | + | + | ++ |
| 2.0 | C-3  | + | + | + | + | + | + | ++ |
| 0    | C-13 | − | − | − | − | − | − | + |
| 1.0  | C-13 | − | + | + | + | + | + | ++ |
| 1.5  | C-13 | + | + | + | + | + | + | ++ |
| 2.0  | C-13 | + | + | + | + | + | + | ++ |
| 0    | H-1  | − | − | − | − | − | − | + |
| 1.0  | H-1  | − | − | − | + | + | + | ++ |
| 1.5  | H-1  | + | + | + | + | + | + | ++ |
| 2.0  | H-1  | + | + | + | + | + | + | ++ |
| 0    | ML-1 | − | − | − | − | − | − | + |
| 1.0  | ML-1 | − | − | − | − | − | − | ++ |
| 1.5  | ML-1 | − | − | − | − | − | − | ++ |
| 2.0  | ML-1 | − | − | − | − | − | + | ++ |
| 2.5  | ML-1 | − | − | + | + | + | + | ++ |
| 3.0  | ML-1 | + | + | + | + | + | + | ++ |

+=Growth.   −=No growth.

EXAMPLE 2

Ratios of primary and secondary sodium phosphate salts to give solutions having pH values in the range of 6.0 to 7.0 were added at the 2% by weight salt level to aliquots of skim milk, and the salted milk was heated at 85° C. for 15 minutes. Tubes of milk representing pH values of 6.0, 6.3, 6.5, 6.7, and 7.0 were inoculated with a constant inoculum of *S. cremoris* R–1 and its phage. The phage titers at time of inoculation and after 24 hours' incubation are presented in Table 2. While the phage titer was in each instance less after 24 hours than at the time of inoculation, the data indicate that the effectiveness of the phosphate treatment increased as the pH of the added phosphate was varied from 6.0 to 7.0.

Table 2

| pH of salt solution | Phage inoculum number/ml. | 24 hour phage titer number/ml. | Reduction phage count, percent |
|---|---|---|---|
| 6.0 | 260 x $10^5$ | 108 x $10^5$ | 58 |
| 6.3 | do | 62 x $10^5$ | 76 |
| 6.5 | do | 72 x $10^4$ | 97 |
| 6.7 | do | 89 x $10^4$ | 97 |
| 7.0 | do | 27 x $10^4$ | 99 |

In developing the inventive process it was also necessary to consider the effect of pH on growth of lactic acid bacteria. Activity tests conducted with different lactic acid cultures on phosphate treated milks indicate an optimum range of 6.0 to 6.5. A combination of the factors of encouraged activity of lactic acid bacteria and effectiveness of control of phage indicate a preferred range of pH of about 6.3 to 6.9 for the phosphate solution to be added to the milk starters.

As previously stated, in applying the invention to manufacturing processes the addition of 2% phosphates did not appear to inhibit the growth of lactic acid bacteria or alter the ratio of strains in a mixed culture. Analytical support regarding activity of cultures grown in phosphate-containing milk and then transferred back to milk has been obtained.

EXAMPLE 3

Example 3 shows the effect of phosphate concentration and pH on the activity of lactic cultures.

Sterile concentrated solutions of sodium phosphates (Na) and potassium phosphates (K), having pH values as shown in Table 3, were added aseptically to flasks of sterile skim milk to provide 2%, 2.5%, and 3% by weight of added phosphates. The mixed phosphates (K—Na) contained equimolar amounts of sodium and potassium salts. The phosphate-containing milks were heated (85° C. for 15 minutes), cooled, inoculated with one of four commercial lactic acid starter cultures, designated as W-1, W-2, W-3, and W-4, and incubated overnight. The next morning transfers (1% inoculum) were made from each of the flasks into test tubes containing 10 ml. sterile milk (no added phosphates). After 6 hours' incubation at 32° C. the acid in each tube was titrated with 0.05 N sodium hydroxide. The titration values are listed in Table 3. Tubes of sterile milk to which no phosphates were added were carried through all the steps and served as controls.

Table 3
EFFECT OF PHOSPHATES UPON ACTIVITY OF CULTURES

| Added phosphates | Percent | pH | Titratable W1 | Acidity with 0.05 N NaOH | | |
|---|---|---|---|---|---|---|
| | | | | W2 | W3 | W4 |
| None | | | 10.4 | 11.4 | 12.4 | 11.9 |
| Na | 2 | 6.2 | 11.1 | 12.4 | 13.4 | 12.2 |
| Na | 2 | 6.5 | 9.9 | 9.8 | 10.4 | 9.9 |
| Na | 2 | 6.8 | 7.0 | 8.2 | 6.8 | 7.1 |
| K-Na | 2 | 6.6 | 11.1 | 10.8 | 12.4 | 12.6 |
| K-Na | 2 | 6.8 | 8.0 | 8.8 | 10.0 | 8.2 |
| K | 2 | 6.8 | 13.4 | 12.8 | 12.9 | 12.7 |
| K | 2 | 7.0 | 10.8 | 13.3 | 14.4 | 13.9 |
| K | 2.5 | 6.8 | 11.3 | 11.9 | 13.1 | 12.4 |
| K | 3.0 | 6.8 | 10.7 | 11.5 | 12.7 | 12.0 |
| K-Na | 2.5 | 6.8 | 6.5 | 7.2 | 8.0 | 6.2 |

All the cultures grown in the milks with 2, 2.5 and 3% potassium phosphate and 2% (K—Na) retained excellent ability to propagate and to produce acid. Cultures grown in 2% sodium phosphate and 2.5 and 3% (K—Na) were slightly less active. Loss in culture activity due to the sodium salts was increased with increases in pH.

The following example demonstrates the importance in the preparation of starter milks of heating the milk after the addition of phosphate salts.

EXAMPLE 4

Sterile concentrated sodium phosphate solution of pH 6.5 was added aseptically to sterile skim milk to provide a level of 2% sodium phosphate salts in the milk. The volume of milk was divided into eight equal parts, each part being placed in a sterile flask. One flask, serving as a control, received no further attention prior to inoculation. Each of the other 7 was given a different heat treatment, as listed in the first column of Table 4. All of the lots of milk were cooled to the same temperature and inoculated with a constant amount of phage and lactic acid bacteria starter culture. After inoculation each lot of milk contained about $38 \times 10^6$ phage particles per ml. of milk. The flasks were incubated for 24 hours at 72° F., then assayed for phage particles per ml. and for growth of the lactic acid bacteria. The results are presented in Table 4.

Table 4
EFFECT OF HEATING MILK WITH 2% PHOSPHATE SALTS AT pH 6.5

| Amount of heat | Phage inoculum number/ml | 24 hour bacterial growth | 24 hour phage titer number/ml |
|---|---|---|---|
| None | $38 \times 10^6$ | − | $195 \times 10^6$ |
| 80° C.–15 min | $38 \times 10^6$ | + | $210 \times 10^4$ |
| 80° C.–30 min | $38 \times 10^6$ | + | $96 \times 10^4$ |
| 85° C.–15 min | $38 \times 10^6$ | + | $85 \times 10^4$ |
| 90° C.–30 min | $38 \times 10^6$ | + | $49 \times 10^4$ |
| 95° C.–15 min | $38 \times 10^6$ | + | $44 \times 10^4$ |
| 95° C.–30 min | $38 \times 10^6$ | + | $44 \times 10^4$ |
| 100° C.–15 min | $38 \times 10^6$ | + | $53 \times 10^4$ |

In the control flask the lactic acid bacteria were destroyed and the phage titer showed an increase in phage particles over that of the inoculum. In all the flasks that were heated there was a significant reduction in the massive phage contamination in this single culturing in the heated phosphated-containing media. The 24 hour phage titer of the milk which received the 80° C.—15 minutes' treatment, while still a large value, actually represents a reduction of almost 95% from the value of the particles in the inoculum, and the lactic acid bacteria were growing in this flask. Hence, in the general application of this invention a heat treatment of at least 80° C. for 15 minutes is considered satisfactory.

An illustration of how the reductions of phage, as demonstrated in Example 4, would reduce or eliminate phage in a manufacturing process, where the culture progresses from mother starter, to intermediate starter, to bulk starter, before being added to a vat of milk, or in repeated maintenance transfers of stock cultures, is presented in Example 5.

EXAMPLE 5

Nine different strains of *Streptococcus lactis* and *S. cremoris*, representing different phage sensitivities, were included in this study. In each instance a sterile milk control and an aliquot of the same milk treated according to the present invention, that is, a 2% by weight level of phosphates, in this instance sodium phosphates, and heated at about 80° C. for 15 minutes, were inoculated with the same amount of lactic acid bacteria and phage. In order to keep other variables constant the pH of the phosphates to be added was made the same as that of the sterile milk control, pH 6.6. Phage particle concentration at time of inoculation was determined by conventional agar plaque techniques using serial dilution. After 24 hours incubation at 72° F. there was no bacterial growth in the controls. Phage titers on the controls were determined and these flasks discarded. All of the lactic acid strains grew on the phosphate-containing heat-treated milk. Every 24 hours each of the growing cultures was transferred to a sterile flask of the new medium until a total of four transfers had been made. The incidence of phage was determined at each step of the procedure. Table 5 lists the different lactic acid strains and homologous phages that is, phages which attack these particular strains, tested, the size of phage inoculum, and phage titers after each successive transfer in phosphate-heat treated milk. All lactic acid strains grew in the presence of phage in the medium of the present invention while none of the nine grew in the normal milk controls. Almost complete destruction of all viable bacterial cells occurred in the controls. The titers of the phage decreased markedly in the treated milk with each transfer. After the third transfer, only one of the nine cultures still contained phage and the fourth transfer sufficed to rid this culture of phage. Thus, the milk medium of this invention is not only a good medium for propagating lactic acid bacteria, but the repeated transfer of a lactic acid culture in this medium served to free the culture of the homologous phage.

*Table 5*
TRANSFERS REQUIRED TO ELIMINATE PHAGE FROM LACTIC CULTURES

| Milk treatment | Lactic culture | Phage inoculum number/ml. | 24 hr. phage titer, number/ml. | Bacterial growth, 24 hrs. | Phage titers after serial transfer, number/ml. | | | |
|---|---|---|---|---|---|---|---|---|
| | | | | | 1st | 2nd | 3rd | 4th |
| None | HP | $27 \times 10^6$ | $41 \times 10^8$ | − | | | | |
| Phosphate | HP | $27 \times 10^6$ | $22 \times 10^4$ | + | 30 | 10 | 0 | 0 |
| None | C-2 | $12 \times 10^6$ | $20 \times 10^8$ | − | | | | |
| Phosphate | C-2 | $12 \times 10^6$ | $98 \times 10^3$ | + | $26 \times 10^2$ | 10 | 0 | 0 |
| None | R-1 | $25 \times 10^6$ | $37 \times 10^8$ | − | | | | |
| Phosphate | R-1 | $25 \times 10^6$ | $49 \times 10^4$ | + | $32 \times 10^2$ | 10 | 0 | 0 |
| None | C-3 | $90 \times 10^6$ | $31 \times 10^8$ | − | | | | |
| Phosphate | C-3 | $90 \times 10^6$ | $15 \times 10^6$ | + | $20 \times 10^3$ | 100 | 0 | 0 |
| None | KH | $23 \times 10^6$ | $39 \times 10^8$ | − | | | | |
| Phosphate | KH | $23 \times 10^6$ | $17 \times 10^4$ | + | 160 | 10 | 0 | 0 |
| None | US-3 | $1 \times 10^8$ | $98 \times 10^8$ | − | | | | |
| Phosphate | US-3 | $1 \times 10^8$ | $38 \times 10^4$ | + | $9 \times 10^2$ | 10 | 0 | 0 |
| None | C-13 | $62 \times 10^6$ | $18 \times 10^8$ | − | | | | |
| Phosphate | C-13 | $62 \times 10^6$ | $42 \times 10^5$ | + | $11 \times 10^2$ | 10 | 0 | 0 |
| None | K | $41 \times 10^6$ | $14 \times 10^8$ | − | | | | |
| Phosphate | K | $41 \times 10^6$ | $65 \times 10^5$ | + | $38 \times 10^3$ | $8 \times 10^2$ | 20 | 0 |
| None | Z-8 | $22 \times 10^6$ | $24 \times 10^8$ | − | | | | |
| Phosphate | Z-8 | $22 \times 10^6$ | $12 \times 10^4$ | + | $4 \times 10^2$ | 10 | 0 | 0 |

The effectiveness of this invention in preventing phage proliferation in bulk starters used in Cheddar cheese manufacture was also demonstrated.

EXAMPLE 6

Two 10 lb. lots of skim milk were taken from the same container. One lot was steam heated, about 95 to 100° C., for one hour. The other lot was heated at about 95 to 100° C. for 30 minutes, 191 ml. of 75% sodium phosphate salts (2% salts by weight of milk) at pH 6.5 was added, and the heating continued for another 30 minutes. Both lots of milk were cooled and inoculated with a constant inoculum of a single strain lactic acid culture. Approximately 200 phage particles per ml. of milk were added to each bulk starter. The bulk starters were incubated overnight for use in cheese manufacture the next day. The starter containing the phosphate salts formed acid and coagulated normally during 18 hours' incubation, whereas the control starter formed little acid and was only partially coagulated. Each of the bulk starters was used to inoculate 400 lb. of milk in a cheese vat. Cheddar cheese of normal body and flavor was manufactured from the starter prepared according to this invention. The conventionally prepared starter failed to develop any appreciable amount of acid in the cheese milk and the manufacture of cheese was a failure. Less than 10 phage particles per ml. were found in the bulk starter containing the phosphate salts, while the conventional bulk starter contained $17 \times 10^8$ phage particles per ml.

The lactic acid bacteria, such as *Streptococcus lactis*, *S. cremoris*, *S. diacetilactis* and *S. thermophilus*, are used in the manufacture of butter, buttermilk, sour cream, yoghurt, and various varieties of cheese.

The use of milk starters prepared according to the present invention provides the industry with a means of preventing failures due to phage contamination in the manufacture of all the aforementioned milk products.

In Example 1 it was shown that one phage type required as much as 3% sodium phosphate by weight with the milk to free a culture of phage. Studies were conducted with this most resistant phage strain in an effort to increase the effectiveness of the orthophosphate treatment at the 2% level of added phosphate. Small amounts of pyrophosphates, polyphosphates and hexametaphosphate were each added to milk, and tested alone and in combination with the orthophosphates. It was found that the sodium and potassium pyrophosphates in combination with about 2% by weight of sodium or potassium phosphate were the most effective in controlling the phage. The pyrophosphate salts added alone to the milk had no effect on the phage; however, it was very effective as a supplement to the orthophosphate treatment already described. It was also found that the ortho- and pyrophosphate concentrates had to be added to the milk in a definite sequence, first the concentrated orthophosphate was mixed with the milk and given the usual heat treatment, namely, heating at 100° C. for from 15 to 30 minutes. At the end of this period, the pyrophosphate concentrate was mixed into the hot milk and the heating process continued for about the same length of time.

The following Example 7 illustrates the effective concentration of potassium pyrophosphate on phage proliferation.

EXAMPLE 7

A volume of reconstituted skim milk was divided into five equal parts. A potassium-sodium phosphate salt solution at pH 6.6 was added to the portions of milk to yield 2.0, 1.9, 1.8, 1.7, and 1.6 by weight, respectively. The 2% portion received no additional phosphates and served as a control for orthophosphate alone. All portions of milk were heated at 100° C. for 30 minutes. A portion of an aqueous solution of potassium pyrophosphate concentrate (30%) was then added to the four remaining portions of milk containing the orthophosphate to yield 0.1% by weight in the flask containing the 1.9 orthophosphate portion, to yield 0.2% in the flask containing the 1.8 orthophosphate portion, to yield 0.3% in the flask containing the 1.7% orthophosphate portion, to yield 0.4% in the flask containing the 1.6 orthophosphate portion.

All five milk portions containing the mixed orthophosphates and pyrophosphates were again heated at 100° for 30 minutes. After cooling, the milks were inoculated with a constant inoculum of ML-1 lactic culture and respective phage. Phage particle concentration was determined at the time of inoculation and after 18 hours' growth in the respective media by the standard agar plaque technique. Every 24 hours, each of the growing cultures was transferred to a fresh lot of phosphate treated milks. This procedure was continued for 4 days. The incidence of phage was determined at each step. Table 6 lists the size of phage inoculum and phage titers after each successive transfer. In referring to Table 6 it may be seen that all levels of milk containing the potassium pyrophosphate were more effective in controlling this very resistant phage strain than the 2% level of orthophosphate buffer alone. Although 0.4% potassium pyrophosphate was the most effective concentration the 0.3% level had less inhibitor effect on the growth of lactic cultures.

Table 6
EFFECT ON PHAGE PROLIFERATION WHEN COMBINED WITH ORTHOPHOSPHATE TREATMENT

| Percent K-pyro-phosphate in milk | Percent K-Na phosphate buffer | ML-1 phage inoculum | Phage titers in milk | | | |
|---|---|---|---|---|---|---|
| | | | 1st day | 2nd day | 3rd day | 4th day |
| None | 2 | 450,000 | 80,000,000 | 320,000,000 | | |
| 0.1 | 1.9 | 450,000 | 120,000 | 140,000 | 175,000 | 3,000,000 |
| 0.2 | 1.8 | 450,000 | 47,000 | 15,000 | 7,000 | 200 |
| 0.3 | 1.7 | 450,000 | 80,000 | 4,000 | 0 | 0 |
| 0.4 | 1.6 | 450,000 | 13,000 | 0 | 0 | 0 |

I claim:

1. A process comprising forming a mixture having a pH of about from 6.3 to 6.9 and containing milk and about from 1 to 3%, based on the weight of the milk, of phosphates selected from the group consisting of sodium orthophosphates, potassium orthophosphates, ammonium orthophosphates, mixtures thereof, mixtures of each of said sodium, potassium, and ammonium orthophosphates with potassium pyrophosphate, and mixtures of each of said sodium, potassium, and ammonium orthophosphates with sodium pyrophosphate, heating the milk containing the phosphates at a temperature of about from 80° to 100° C. for at least about 15 minutes to produce a milk medium resistant to the growth of, and free from, bacteriophage, cooling the thus-produced milk medium to a temperature suitable for inoculation with lactic acid bacteria, and culturing lactic acid bacteria in said bacteriophage-growth resistant and bacteriophage-free milk medium.

2. The process of claim 1 wherein the phosphates are sodium orthophosphates.

3. The process of claim 1 wherein the phosphates are potassium orthophosphates.

4. The process of claim 1 wherein the phosphates are a mixture of sodium and potassium orthophosphates.

5. The process of claim 1 wherein the phosphates are a mixture of potassium phosphates and potassium orthopyrophosphate.

6. The process of claim 1 wherein the phosphates are a mixture of sodium orthophosphates and sodium pyrophosphate.

7. The process of claim 1 wherein the milk is selected from the group consisting of skim milk and whole milk.

8. The process of preparing mother starters comprising forming an aseptic mixture having a pH of about from 6.3 to 6.9 and containing sterile milk and about from 1 to 3%, based on the weight of the milk, of phosphates selected from the group consisting of sodium orthophosphates, potassium orthophosphates, ammonium orthophosphates, mixtures thereof, mixtures of each of said sodium, potassium and ammonium orthophosphates with potassium pyrophosphate, and mixtures of each of said sodium, potassium, and ammonium orthophosphates with sodium pyrophosphate, heating the milk containing the phosphates at a temperature of about from 80° to 100° C. for at least about 15 minutes to produce a milk medium resistant to the growth of, and free from, bacteriophage, cooling the thus-produced milk medium to a temperature suitable for inoculation with lactic acid bacteria, and culturing lactic acid bacteria in said bacteriophage-growth resistant and bacteriophage-free milk medium.

9. A process of preparing bulk starters comprising forming a mixture having a pH of about from 6.3 to 6.9 and containing bacteriophage-contaminated milk and about from 1 to 3%, based on the weight of the milk, of phosphates selected from the group consisting of sodium orthophosphates, potassium orthophosphates, ammonium orthophosphates, mixtures thereof, mixtures of each of said sodium, potassium, and ammonium orthophosphates with potassium pyrophosphate, and mixtures of each of said sodium, potassium, and ammonium orthophosphates with sodium pyrophosphate, heating the milk containing the phosphates at a temperature of about from 80° to 100° C. for at least about 15 minutes to produce a milk medium resistant to the growth of, and free from, bacteriophage, cooling the thus-produced milk medium to a temperature suitable for inoculation with lactic acid bacteria, and culturing lactic acid bacteria in said bacteriophage-growth resistant and bacteriophage-free milk medium.

10. A process of preparing a culture of lactic acid bacteria resistant to the growth of, and free from, bacteriophage comprising forming a mixture having a pH of about from 6.3 to 6.9 and containing milk and about from 1 to 3%, based on the weight of the milk, of phosphates selected from the group consisting of sodium orthophosphates, potassium orthophosphates, ammonium orthophosphates, mixtures thereof, mixtures of each of said sodium, potassium and ammonium orthophosphates with potassium pyrophosphate, and mixtures of each of said sodium, potassium, and ammonium orthophosphates with sodium pyrophosphate, heating the milk containing the phosphates at a temperature of about from 80° C. to 100° C. for at least about 15 minutes to produce a milk medium resistant to the growth of, and free from, bacteriophage, cooling the thus-produced milk medium to a temperature suitable for inoculation with bacteriophage-contaminated lactic acid bacteria, aseptically inoculating a first sample of the cooled milk medium with bacteriophage-contaminated lactic acid bacteria, incubating the thus-inoculated first sample of the cooled milk medium for about 24 hours at about 72° F., transferring a culture from the resulting incubated first sample to a second sample of the cooled milk medium, incubating the second sample under the same conditions employed for the first sample, and continuing the transfer of the resulting culture from each successive incubated sample to a new sample of the cooled milk medium until a culture of lactic acid is obtained which is resistant to growth of, and free from, bacteriophage.

References Cited in the file of this patent
UNITED STATES PATENTS 2,474,046    Fries _____ June 21, 1949

OTHER REFERENCES

Jezeski: "Annual Review of Microbiology," vol. 8, 1954, pp. 437–439.

Collins et al: "Journal of Bacteriology," vol. 60, July–December 1950, pp. 533 to 542.

Burrows: "Textbook of Microbiology," 16th edition, W. B. Saunders Co., Philadelphia, Pa., 1954, p. 15.